UNITED STATES PATENT OFFICE.

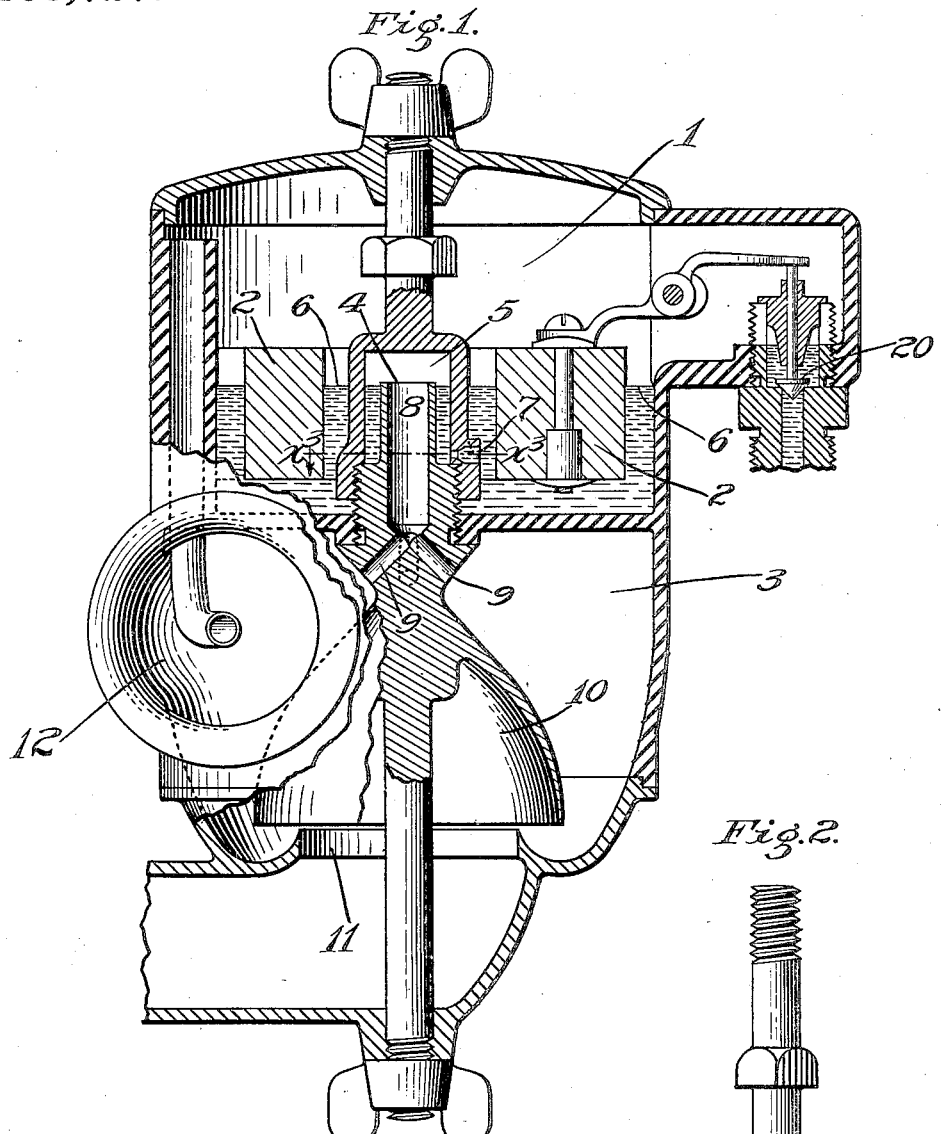
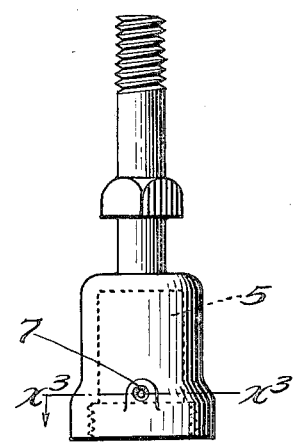
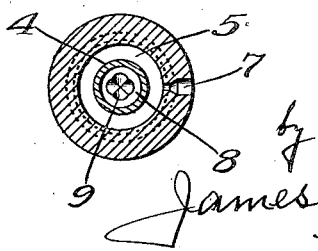

ROY FRANCIS ENSIGN, OF PASADENA, CALIFORNIA, ASSIGNOR TO ORVILLE H. ENSIGN, OF PASADENA, CALIFORNIA.

VAPORIZER.

1,108,727.  Specification of Letters Patent.  Patented Aug. 25, 1914.

Application filed May 23, 1912. Serial No. 699,348.

*To all whom it may concern:*

Be it known that I, ROY FRANCIS ENSIGN, a citizen of the United States, residing at Pasadena, in the county of Los Angeles and State of California, have invented a new and useful Improvement in Vaporizers, of which the following is a specification.

This invention relates to that class of vaporizers in which liquid is supplied by downward flow to a mixing chamber from a nozzle that is above such chamber and is supplied through the medium of a supply chamber and a float valve which regulates the liquid level in the supply chamber. In vaporizers of this character a difficulty arises from liability of siphonage through the orifice and passage that communicates between the two chambers.

An object of this invention is to provide a cheap and simple vaporizer in which any such siphoning of the liquid is made impossible.

The accompanying drawings illustrate the invention.

Figure 1 is a fragmental sectional elevation of a vaporizer embodying the invention. Fig. 2 is an elevation of the nozzle chamber detached. Fig. 3 is a plan section of the nozzle chamber and nozzle from line $x^3$, Figs. 1 and 2.

The supply chamber 1, valve float 2 therein, the valve 20, and the mixing chamber 3 are of the construction and arrangement common in said class of vaporizers.

The nozzle 4 is inclosed within the nozzle chamber 5 and projects upward therein to a point just above the liquid level 6 which is maintained by the float 2 and its valve 20. Said nozzle chamber 5 is provided with a restricted inlet orifice 7 leading into the nozzle chamber from the supply chamber 1 below the liquid level 6 therein. The nozzle outlet orifice and bore 8 is of greater cross-sectional area than the restricted orifice 7, and communicates with the interior of the mixing chamber 3 through the distributing ports 9 that are above the distributer 10 which is mounted inside the mixing chamber 3 above the central mixture outlet 11 leading from the mixing chamber. The vaporizer may be put in operation either by air forced through the mixing chamber from the intake nozzle 12 by compression or suction, thus reducing the pressure acting in opposition to that acting on the contents of the mixing chamber.

By the means shown the liquid level is normally maintained at the same height inside the nozzle chamber as in the supply chamber outside the nozzle chamber when no air is flowing, and by means of the supply chamber in which the liquid is subject to air pressure in opposition to the air pressure at the nozzle orifice, the liquid level is raised when the pressure at the nozzle is lowered.

When air is caused to move from the air intake nozzle 12 through the mixing chamber 3 to the outlet, it flows in vortex form and thereby suction is applied to the nozzle passage 8 and the liquid inside the nozzle chamber will rise from the pressure in the supply chamber and will flow over the rim of the outlet nozzle orifice and thence down by gravity into the mixing chamber where it is acted upon by the moving air in the same manner as with other vaporizers of the class specified.

Since the nozzle orifice and bore 8 is of larger cross section than the restricted orifice 7 through which the supply flows, and the ports 9 are of sufficient cross-section to prevent holding the liquid as a seal by capillary attraction, it is impossible for any siphoning action to be set up or maintained in or through passages 7, 8, 9, and consequently no liquid from the supply chamber can reach the nozzle orifice except when forced thereto by the difference of the pressures upon the surfaces of liquid outside and inside the nozzle chamber.

In a carbureter for an internal combustion engine, the inlet orifice 7 is of such restricted cross-sectional area as to allow only a required amount of the fuel liquid to pass through to supply to the engine, not shown, the maximum charge of fuel mixture. The amount of mixture in each charge will be determined by the usual throttle, not shown, common to fuel supplying devices for internal combustion engines.

It is to be noted that in this invention, the restricted orifice is a submerged orifice leading into the bottom of the nozzle chamber; and that between it and the passage communicating from the air in the nozzle chamber to the air in the mixing chamber is a mass of liquid, which in order to flow between the two must rise within the nozzle chamber and flow over and down through the passage 8. Care must be taken in this construction to be sure that the lower end of the passage constituted by 8 and 9 is sufficiently large not to sustain a capillary seal, and that the upper end is open to the air in the nozzle chamber.

I claim:—

1. In a vaporizer the combination with supply and mixing chambers and with means to maintain a determined liquid level in the supply chamber, of a nozzle chamber provided with a restricted inlet orifice near the bottom of the nozzle chamber leading from the supply chamber into the nozzle chamber and a passage opening from the nozzle chamber above the normal liquid level therein and leading downward therefrom and communicating with the mixing chamber; the cross sectional area of the passage leading down from the nozzle chamber being greater than the cross sectional area of the inlet to such chamber, and the mixing chamber being below the level of the nozzle chamber.

2. A vaporizer comprising a supply chamber and a mixing chamber below the supply chamber, a nozzle chamber within the supply chamber, there being a restricted orifice communicating from the supply chamber into the nozzle chamber near the bottom of the nozzle chamber, and a vertical passage terminating above the liquid in the nozzle chamber and communicating between the air space in the nozzle chamber and the mixing chamber, said passage having a cross-sectional area throughout its length several times that of the restricted orifice, and means to maintain the static liquid level in the supply chamber and the nozzle chamber slightly below the top of said passage.

3. A vaporizer comprising a supply chamber, a mixing chamber below the supply chamber, means to maintain a practically constant height of the liquid in the supply chamber, a vertical tube communicating from above the static liquid surface in the supply chamber to the mixing chamber, means to seal the top of the tube from the air in the supply chamber, and means consisting of a submerged restricted orifice for admitting the liquid from the supply chamber to surround the tube and to flow over and down the tube to the mixing chamber when the pressure in the mixing chamber is less than atmospheric, the area of the bore of the tube being several times the area of the restricted orifice.

4. The combination with a mixing chamber having a nozzle communicating therewith, of a supply chamber, and a nozzle chamber fastened to the nozzle and provided with an inlet in constant communication with the supply chamber, said inlet being of less cross sectional area than the bore of said nozzle.

In testimony whereof, I have hereunto set my hand at Los Angeles, California, this 18th day of May, 1912.

ROY FRANCIS ENSIGN.

In presence of—
JAMES R. TOWNSEND,
L. BELLE RICE.